May 1, 1956 E. J. GARGINI 2,744,157

TELEVISION APPARATUS FOR USE IN RELAY SYSTEMS

Filed Feb. 7, 1952 2 Sheets-Sheet 1

Inventor:
ERIC JOHN GARGINI
By Ralph E. Atherton
Attorney

May 1, 1956 E. J. GARGINI 2,744,157

TELEVISION APPARATUS FOR USE IN RELAY SYSTEMS

Filed Feb. 7, 1952 2 Sheets-Sheet 2

INVENTOR
E.J. GARGINI
BY Glascock Downing & Seebold
ATTORNEYS

United States Patent Office 2,744,157

Patented May 1, 1956

2,744,157

TELEVISION APPARATUS FOR USE IN RELAY SYSTEMS

Eric John Gargini, Yiewsley, England, assignor to Electric & Musical Industries Limited, Hayes, England, a company of Great Britain Application February 7, 1952, Serial No. 270,420

Claims priority, application Great Britain February 24, 1951

11 Claims. (Cl. 178—5.8)

This invention relates to television apparatus for use in wired relay systems. In one such system the relay station transmits video signals by a modulated carrier wave over wire to subscribers, each of whom is provided with a television receiver which comprises in general a cathode ray tube for reproducing the vision signals, an amplifier for amplifying the vision signals and circuits for generating line and frame frequency scanning waveforms and high voltage for operating the cathode ray tube. Such a receiver may also, if desired include several pre-tuned sound channels whereby ordinary sound broadcasts can be selectively received on the same receiver and one of said broadcast channels may be arranged to transmit to the television receiver, television sound when the receiver is switched for television operation.

In relay systems there is the possibility that the subscriber may leave the receiver switched on even though the vision transmission may have ceased. This, consequently, is wasteful of the life of the valves and cathode ray tube of the receiver and it is the object of the present invention to provide an improved receiver with a view to overcoming this possibility.

According to one feature of the present invention a television receiver for use in a relay system is provided in which it is arranged that, some of the valves and cathode ray tube of the receiver are automatically switched off under the control of the relay station.

Figure 1:
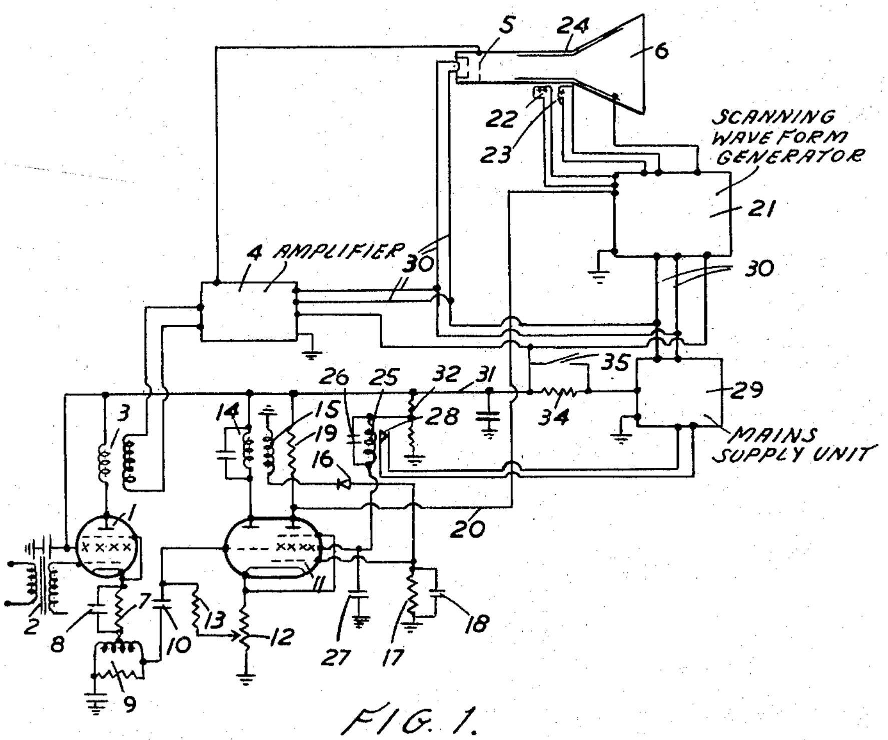
Figure 2:
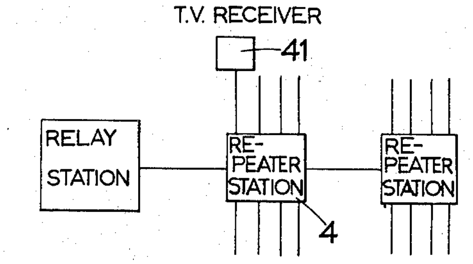
Figure 3:
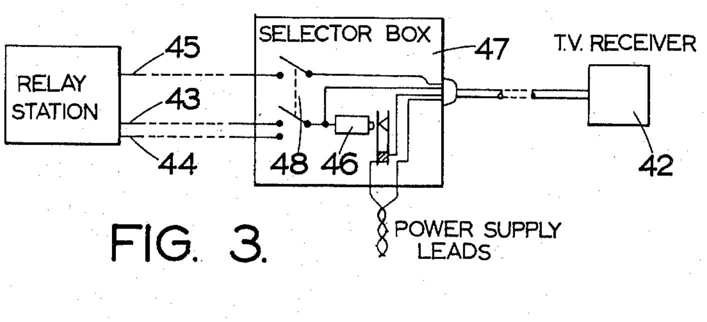
Figure 4:
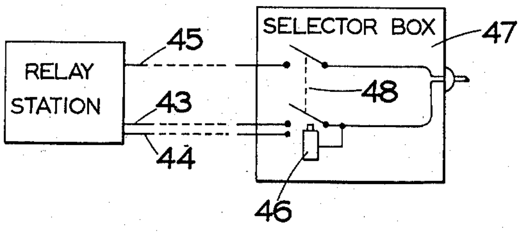

In order that the said invention may be clearly understood and readily carried onto effect, it will now be more fully described with reference to the accompanying drawings in which;

Figure 1 illustrates diagrammatically the circuit of a television receiver according to one embodiment of the invention suitable for use in a relay system, Figure 2 illustrates in block diagrammatic form a feature of the invention as applied to repeater stations, Figure 3 illustrates in block diagrammatic form a further embodiment of the invention, and Figure 4 shows a modification of Figure 3.

In one proposed television relay system the relay station is arranged to transmit video signals on a carrier wave of 5.4 megacycles per second and waveforms for effecting line and frame frequency deflection of the beam of the cathode ray tube at the receiver are transmitted on a separate carrier wave of 1 megacycle per second as proposed in the specification of co-pending patent application Serial No. 232,577. These two carrier waves are applied to the control electrode of a separating valve 1 through an input transformer 2, the video carrier wave being applied from the anode of the valve 1 through a transformer 3 to an amplifier 4, where the carrier wave is rectified and amplified and fed to the control electrode 5 of a cathode ray receiving tube 6. The cathode of the valve 1 is biassed by a resistance 7 shunted by a by-pass condenser 8 and is connected to a tapping point on a circuit 9 which is tuned to the frequency of the carrier wave which is modulated by the scanning waveforms. The tuned circuit 9 is connected through a coupling condenser 10 to the control electrode of the triode section of a triode-pentode valve 11, the cathode of which is connected to earth through a resistance 12 to which the control electrode of the triode section is connected through a leak resistance 13, the tapping point on the resistance 12 being suitably chosen according to required biassing conditions. The anode of the triode section is connected to a circuit 14 which is tuned to the scannning waveform carrier wave and this tuned circuit is coupled via a coupling coil 15 to a rectifier 16 having a load resistance 17 shunted by a by-pass condenser 18 and connected to the control electrode of the pentode section of the valve 11. The pentode section thus serves to amplify the rectified scanning waveforms and the amplified scanning waveforms appearing at the anode end of the anode load resistance 19 are applied via lead 20 to a scanning waveform amplifier 21 which serves to amplify and shape the line and frame frequency scanning waveforms for application to the line scanning deflecting coils 22 and the frame frequency deflecting coils 23 of the cathode ray tube 6. The amplifier 21 also serves to generate a high voltage for application to the final anode 24 of the cathode ray tube, such high voltage being generated in known manner by rectifying the voltage pulses set up across the line frequency waveform amplifier during the return strokes of the sawtooth waves. The screening grid circuit of the pentode section of the valve 11 is provided with a relay indicated at 25 which is shunted by a condenser 26 and coupled to earth through a condenser 27 so as to prevent sudden changes of the screening grid potential, the contacts 28 of the relay 25 being connected to the mains supply unit indicated at 29. The mains supply unit 29 serves to supply the heaters of the valves employed in the amplifier 4 and the valves in the amplifier 21 and also the heater of the cathode ray tube 6 through heater supply leads 30. The mains supply unit 29 also supplies high tension voltage for the valves 1 and 11 for which purpose the anodes and screening electrodes of said valves are connected to high tension supply lead 31, the screening grid of the pentode section of the valve 11 also being connected to said lead 31 through a potentiometer 32. The anodes and other electrodes of the valves in the amplifier 4 and 21 which require to be supplied with high tension voltage are also connected to the lead 31 as shown and there is provided in the lead 31 a series resistance 34 which is bridged by a switch 35, the contacts of which are operated by the relay 25. The relay 25 is so arranged that when the scanning waveform carrier wave is absent the relay is operated so that the heater circuits of the valves in the amplifier 4 and in the amplifier 21 are switched off, together with the heater circuit of the cathode ray tube 6 and simultaneously the switch 35 is opened so that the resistance 34 is introduced into the high tension supply lead 31 in order to maintain the correct voltage for the valves 1 and 11 which will remain in their operating condition until the receiver is switched off by the subscriber. Thus with the circuit according to the invention even though the subscriber may omit to switch the receiver off when a television transmission ceases, the relay 25 will be operated when the scanning waveform is absent so that several of the valves and the cathode ray tube are switched off when the television transmission ceases, whereby wasteful use of the life of these components is prevented.

In some relay systems, as shown diagrammatically in Figure 2, a number of repeater stations 40 may be provided which serve to feed a number of subscribers' television receivers 41, no external power supply being necessary to operate the receivers, since the scanning waveforms and video signals are transmitted by the repeater station with suitable amplification. In such an arrangement it is desirable to switch-off some of the valves of the repeater station, when the television transmission ceases, in which case a circuit similar to that described with reference to Figure 1 may be employed at the repeater stations 40 so that the relay 25 of Figure 1 is operated when the scanning waveform is absent.

In another relay system as shown in Figure 3 where no radio frequency sound channels are provided, the television receiver 42 which is provided with amplifying valves and a power supply similar to the receiver described with reference to Figure 1 may be arranged to be fed with sound signals via one or another of a plurality of sound signal channels 43, 44 and with video signals via another channel 45 or carrier frequency modulated video signals on one of the sound channels and when a television broadcast is in progress one of the said sound signal channels is arranged to be fed with suitable current from the relay station for the purpose of operating a relay 46 at the receiver so as to maintain the television receiver in operation but when the television transmission ceases the relay is de-energised from the relay station so as to switch-off the receiver. The relay 46 may be disposed at a position remote from the receiver and arranged in a selector box 47 which is provided with a switch 48 for selecting one or other of the sound broadcast channels or a television channel when a television broadcast is in progress. When the switch is operated to select a television broadcast one of the sound channels then serves to apply said current to the relay so that the television receiver is maintained in operation. When the television broadcast ceases the relay serves to switch the receiver off if the selector switch 48 should be allowed to remain in a position for selecting a television broadcast. In some cases, as shown in Figure 4, it may be arranged that the selector switch 48 is actuated by said relay 46 when the television broadcast ceases so that operation of the selector switch by the relay serves to switch off the television receiver.

What I claim is:

1. In a wired television relay system having a relay station for transmitting video and control signals, a television relay receiver including at least one thermionic valve with a heater, a cathode ray reproducing tube with a heater, a mains supply unit for supplying current to the heaters of said valve and cathode ray tube, and a relay device comprising a coil and contacts, said contacts being connected in circuit with said mains supply unit and signals transmitted by means feeding and control signals to said coil to operate said contacts to switch off the current supply to the heaters of said valve and cathode ray tube.

2. In a television relay system according to claim 1 including at least one channel through in which sound signals are transmitted by said relay system and said control signals are fed through said sound signal channel to operate said relay at said receiver.

3. In a television relay system according to claim 1 in which video signals are transmitted by carrier wave and scanning waveforms for deflecting the cathode ray beam of said cathode ray tube of the receiver and constituting said control signals are transmitted by another carrier wave, said television receiver including an amplifier tube for amplifying said scanning waveforms, and said relay device being connected to one of the electrodes of said tube to be operated to switch off said current supply on cessation of said scanning waveform.

4. A television receiver for use in a wired relay system in which video signals are transmitted by carrier wave and scanning waveforms for deflecting the cathode ray beam of the cathode ray tube of the receiver are transmitted by another carrier wave, said receiver including at least one thermionic valve, a cathode ray reproducing tube, said valve and tube having heaters, a mains supply unit for supplying current to the heaters of said valve and cathode ray tube, a relay device comprising a coil and contacts, said contacts being connected in circuit with said mains supply unit and said coil being connected to said valve to which said scanning waveforms are applied to switch off the current supply to the heaters of said valve and cathode ray tube on cessation of the scanning waveform.

5. A television receiver according to claim 4, including a rectifier for rectifying said scanning waveforms, and means for feeding said rectified scanning waveforms to said valve to which said relay device is connected, said latter valve having a screening grid, and the coil of said relay device being connected to said screening grid.

6. A television receiver according to claim 4, including a high tension power supply for said valves, a resistance in circuit with said high tension supply, and a switch to short-circuit said resistance, said switch being coupled to said relay device to open the circuit to said resistance when said relay is operated to switch off said current supply.

7. A television receiver according to claim 4, including a separating valve, means for feeding said carrier waves to said separating valve to separate the video signal carrier and scanning waveform carrier, means for feeding the video signal carrier from the anode circuit of said separating valve to a video signal amplifier, and means for feeding the scanning waveform carrier wave from the cathode circuit of said separating valve to a scanning waveform amplifier, said relay being connected to switch off the heater circuits of the video signal amplifier and said scanning waveform amplifier.

8. In a wired television relay system having a relay station for transmitting video signals, in which said video signals are transmitted by carrier wave and scanning waveforms for deflecting the cathode ray beam of a cathode ray receiving tube are transmitted by another carrier wave, a repeater station having thermionic valves with heaters for amplifying said carrier waves, a mains supply unit for supplying current to the heaters of said valves, and a relay device comprising a coil and contacts, said contacts being connected in circuit with said mains supply unit and said coil is connected to one of the valves to which said scanning waveforms are applied to switch off the current supply to the heaters of some of said valves on cessation of said scanning waveform.

9. A television receiver for use in a wired relay system transmitting video signals and control signals, said receiver having at least one sound broadcast signal channel and a channel for video signals, a relay device comprising a coil and contacts, a power supply unit for said receiver, said contacts connecting said relay device in circuit with said power supply and in circuit with one of said channels to switch off the receiver under the control of said control signals transmitted by the relay station.

10. A television receiver according to claim 9, said receiver having a selector switch for selecting one of said channels, said selecting switch having contacts connecting said relay device to a sound broadcast channel to switch off said television receiver.

11. A television receiver for use in a relay system in which video signals are transmitted by carrier wave and scanning waveforms for deflecting the cathode ray beam of the cathode ray tube of the receiver are transmitted by another carrier wave, said receiver including a separating valve, means for feeding said carrier waves to said separating valve to separate the video signal carrier and scanning waveform carrier, means for feeding the video signal carrier from the anode circuit of said separating valve to a video signal amplifier, means for feeding the scanning waveform carrier wave from the cathode circuit of said separating valve to a scanning waveform amplifier, a rectifier for rectifying said scanning waveforms, means for feeding said rectified scanning waveforms to a further valve having a screening grid, a relay device connected to said screening grid, a cathode ray reproducing tube, a mains supply unit for supplying current to the heaters of said valves and cathode ray tube, a relay device connected to the screening grid of said further valve, means connecting said relay device in circuit with the mains supply unit to switch off the heater current supply to at least one of said valves and said cathode ray reproducing tube on cessation of said scanning waveform, a high tension supply for said valves, a resistance in circuit with said high tension supply, a switch to short-circuit said resistance, and means coupling said switch to said relay device to open the circuit to said resistance when said relay is operated to switch off said current supply.

References Cited in the file of this patent

UNITED STATES PATENTS

| | | |
|---|---|---|
| 1,909,765 | Jenkins | May 16, 1933 |
| 2,022,665 | Halstead | Dec. 3, 1935 |
| 2,558,489 | Kalfaian | June 26, 1951 |
| 2,585,034 | Purington | Feb. 12, 1952 |